United States Patent
Brown et al.

(10) Patent No.: US 8,929,650 B2
(45) Date of Patent: Jan. 6, 2015

(54) IMAGE COLOR CORRECTION

(71) Applicant: International Business Machines Corporation, Armonk, NY (US)

(72) Inventors: Lisa M. Brown, Pleasantville, NY (US); Ankur Datta, White Plains, NY (US); Sharathchandra U. Pankanti, Darien, CT (US)

(73) Assignee: International Business Machines Corporation, Armonk, NY (US)

( * ) Notice: Subject to any disclaimer, the term of this patent is extended or adjusted under 35 U.S.C. 154(b) by 188 days.

(21) Appl. No.: 13/687,370

(22) Filed: Nov. 28, 2012

(65) Prior Publication Data

US 2014/0147041 A1    May 29, 2014

(51) Int. Cl.
  G06K 9/00    (2006.01)
  G06T 5/00    (2006.01)

(52) U.S. Cl.
  CPC .................................. *G06T 5/00* (2013.01)
  USPC ......................................................... 382/167

(58) Field of Classification Search
  CPC ..... H04N 1/2158; H04N 1/3876; H04N 1/56; H04N 1/60; H04N 1/6005; H04N 1/6027; H04N 1/6075; H04N 1/6077; H04N 1/62; H04N 1/622; H04N 1/628; H04N 5/20; H04N 5/217; H04N 5/2256; H04N 5/33; H04N 5/3651; H04N 9/643; H04N 9/68; H04N 9/73; H04N 2101/00; H04N 2201/0084; G09G 5/02; G09G 2320/0626; G09G 2320/0673; G09G 2340/0457; G09G 2340/06; G06T 5/00; G06T 7/408; G06T 2207/10024
  See application file for complete search history.

(56) References Cited

U.S. PATENT DOCUMENTS

| | | | |
|---|---|---|---|
| 6,002,806 A * | 12/1999 | Morikawa | 382/274 |
| 6,075,903 A | 6/2000 | Breiter et al. | |
| 6,788,812 B1 * | 9/2004 | Wilkins | 382/167 |
| 6,813,040 B1 | 11/2004 | Uchino et al. | |
| 6,898,312 B2 | 5/2005 | Schroder | |
| 7,113,310 B2 * | 9/2006 | Morikawa | 358/3.1 |
| 7,528,991 B2 * | 5/2009 | Naccari et al. | 358/1.9 |
| 7,583,403 B2 * | 9/2009 | Ito et al. | 358/1.9 |
| 8,723,982 B2 * | 5/2014 | Yanagita et al. | 348/228.1 |
| 2004/0109077 A1 | 6/2004 | Abdellatif | |

OTHER PUBLICATIONS

Brown et al., Exploiting Color Strength to Improve Color Correction, 4 pages.

* cited by examiner

*Primary Examiner* — Jose Couso
(74) *Attorney, Agent, or Firm* — Schmeiser, Olsen & Watts, LLP; William E. Schiesser

(57) ABSTRACT

Color-correcting a digital image comprising P pixels (P≥4) is presented. Each of the P pixels has a respective color. Color strengths of the P pixels are determined based at least on respective intensities, respective saturations, or both respective intensities and respective saturations of the P pixels. A subset of the P pixels less than all of the P pixels is determined. The pixels in the subset have respective color strengths in a range of respective color strength. All other pixels of the P pixels have respective color strengths outside of the range of respective color strengths. Color correction is determined for the P pixels based in part on the colors of the respective pixels in the subset which are the only pixels of the P pixels used for determining the color correction. The colors of the P pixels are corrected based on the color correction.

20 Claims, 9 Drawing Sheets

IMAGE COLOR CORRECTION

TECHNICAL FIELD

The present invention relates generally to processing of images and more specifically to color correction of images.

BACKGROUND

Color information is an important feature for many vision algorithms including color correction, image retrieval and tracking. Color correction methods are used to compensate for illumination conditions. In human perception such correction is called color constancy, which is the ability to perceive a relatively constant color for an object even under varying illumination. Most computer methods are pixel-based, correcting an image so that the image's statistics satisfy assumptions. One such assumption is the average intensity of the scene under neutral light being achromatic. Another assumption is that for a given illuminant, there is a limited number of expected colors in a real-world scene.

Various schemes have been proposed to use features including higher order derivatives or homogeneous color regions. These features are chosen based on their likelihood to best characterize the illuminant color and ignore the specific color of the objects in the scene. For example, higher order derivatives are used based on the assumption that the average of reflectance differences in a scene is achromatic. As another example, homogeneously colored segments can be used to catalog the colors that appear in a scene, thereby reducing the influence of a single large region.

However, none of the existing methods account for the fact that even at the level of the individual pixels, the reliability of the color information varies.

Color constancy methods have been categorized into three major groups (static, gamut-mapping, and learning-based) and extensively evaluated by Gijsenij et al. See E. A. Gijsenij, T. Gevers, and J. van de Wiejer, "Computational Color Constancy: Survey and Experiments," IEEE Trans. On Image Processing, Vol 20, No. 9, September 2011.

These methods are an important precursor to improve algorithms which rely on color such as image retrieval, matching color across cameras and long term background modeling for surveillance. The typical methodology, whether based on learning or not, and regardless of the underlying assumptions, still rely on global image statistics.

Preprocessing for color correction often involves local averaging or Gaussian smoothing. This serves to reduce noise and has been shown to be beneficial for color correction. See K. Barnard, L. Martin, A. Coath, and B. Funt, "A comparison of computational color constancy algorithms—part ii: experiments with image data," IEEE Trans. on Image Processing, vol. 11, no. 9, pp 985-996, September 2002. See, also, J. van de Weijer, Th. Gebers, A. Gijsenij, "Edge-based color constancy," IEEE Trans. on Image Processing, vol. 16, no. 9, September 2007.

However, this type of noise reduction, while it may improve performance overall, introduces artifacts along high gradients and potentially ignores relevant information.

In earlier work in color histograms, methods are based on one of the perceptually uniform color spaces. Several investigators have concluded that the features derived from perceptually uniform space are in many ways optimal for color image retrieval. See D. Borhesani et al., "Color Features Performance Comparison for Image Retrieval," *Image Analysis and Processing—ICIAP* 2009, Lecture Notes in Computer Science, Springer Berlin/Heidelberg, p 902-210, August 2009.

In order to avoid instability along the gray axis in hue-based spaces such HSV/HSB/HIS: (i) a weighting system was developed (see J. van de Weijer, T. Gevers, & A. Bagdanov, "Boosting Color Saliency in Image Feature Detection," *IEEE Trans. Pattern Analysis and Machine Intelligence* (PAMI), Vol 28, No. 1, p 150-156, 2006); (ii) a non-uniform binning system was developed (see Z. Lei, et al., "A CBIR Method Based on Color-Spatial Feature," *Proc. IEEE Region 10 Annual International Conference* 1999 (TENCON'99), Cheju, Korea. p 166-169, 1999; and (iii) a chromatic/achromatic splitting method by was developed (see L. Brown, "Example-based Color Vehicle Retrieval for Surveillance," IEEE MMSS Workshop, Boston, Mass. September 2010).

In spite of such technology, it remains the case that hue information becomes unreliable near the gray axis: the transformation to hue-based spaces is ill-conditioned near the gray axes and the noise inherent in the raw RGB images is therefore amplified.

BRIEF SUMMARY

The present invention provides a method for color-correcting a digital image comprising P pixels, P being a positive integer of at least 4, each of the P pixels having a respective color, the method comprising. One or more processors determine color strengths of the P pixels, respectively, based at least on respective intensities, respective saturations, or both the respective intensities and the respective saturations of the P pixels. The one or more processors determine a subset of the P pixels less than all of the P pixels, the pixels in the subset having respective color strengths in a range of respective color strength, all other pixels of the P pixels having respective color strengths outside of the range of respective color strengths. The one or more processors determine color correction for the P pixels based in part on the colors of the respective pixels in the subset which are the only pixels of the P pixels used for determining the color correction parameters. The colors of the P pixels are corrected based on the color correction.

DETAILED DESCRIPTION

Figure 1:
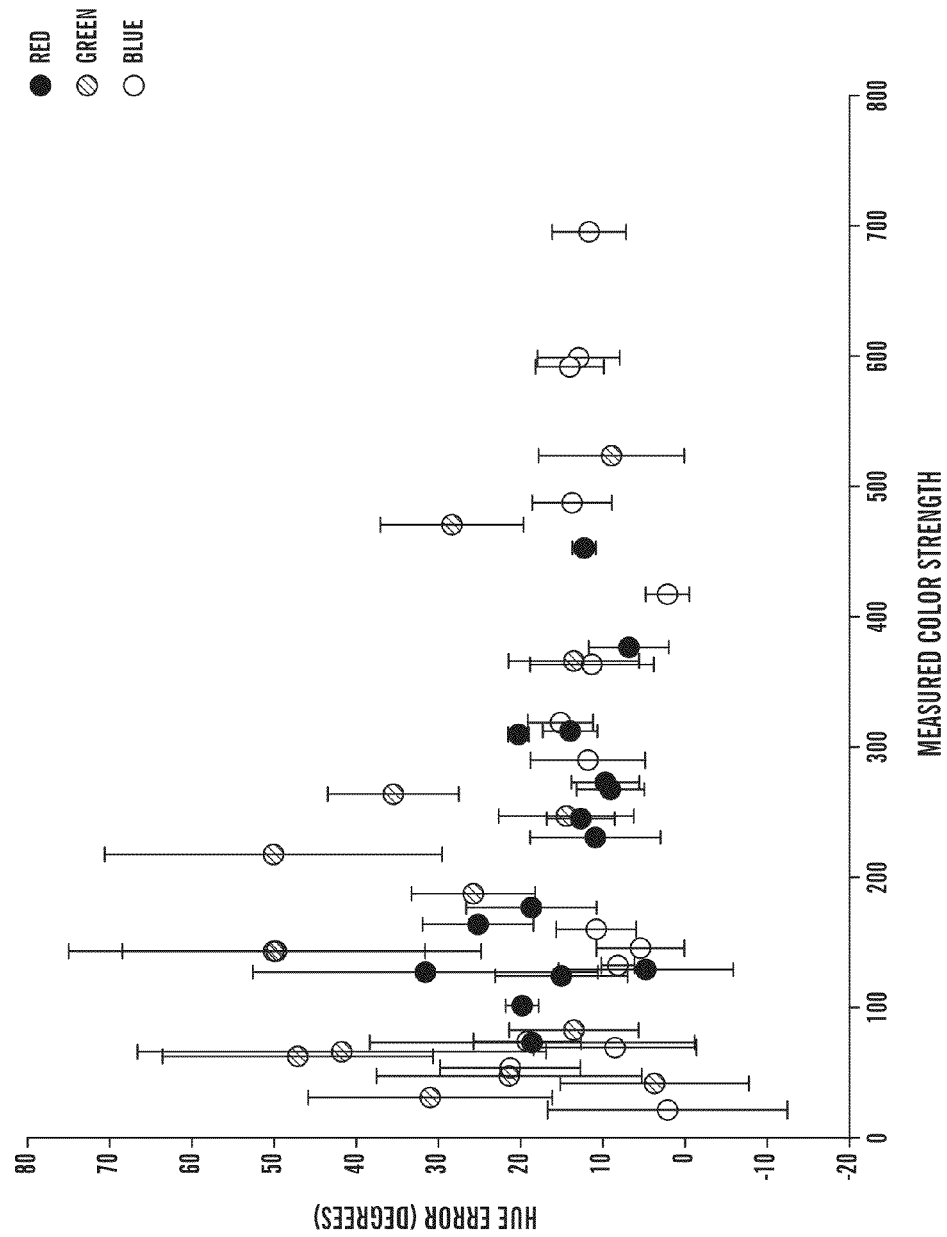
FIG. 1 is a plot of hue error versus measured color strength from analysis of images obtained with an indoor camera, in accordance with embodiments of the present invention.

A digital image may be contained in a set of pixels such that each pixel has a RGB color defined by a red (R), a green (G) value, and a blue (B) value. In one embodiment, the R, G, and B values are each an integer in a range of 0-255. The following definitions for the hue (H) at each pixel, the saturation (S) at each pixel, and the intensity (I) at each pixel assume that R, G, B, S, and I are each normalized to be in a real number in a range of 0 to 1, and H is a real number in a range of 0 to 360 degrees. The parameters M and N, and C appearing in the following definitions of H, S, and I are defined as M=max(R, G, B), N=min(R, G, B), and C=M−N.

The hue (H) is defined by Equation (1):
H is undefined if C=0;

$$H = (60 \text{ deg}) \times ((G - B)/C) \mod 6 \text{ if } M = R; \quad (1)$$
$$= (60 \text{ deg}) \times ((B - R)/C) + 2 \text{ if } M = G;$$
$$= (60 \text{ deg}) \times ((R - G)/C) + 4 \text{ if } M = B.$$

The Intensity (I) is defined by Equation (2):
$$I = (R+G+B)/3 \quad (2)$$

The saturation (S) is defined by Equation (3):

$$S = 0 \text{ if } C = 0; \quad (3)$$
$$= C/(1 - N/I) \text{ if } C \neq 0.$$

The present invention provides a model that improves the performance of color correction by introducing color strength which is a measure of color information accuracy. In one embodiment, color strength is a combination of saturation and intensity information which may be used to determine when hue information in a scene is reliable. The description herein presents verification of the predictive capability of this model, with respect to ground truth information, on two different datasets and demonstrates the model's practical value to improve a range of color correction approaches.

The following experiment conducted by the inventors of the present invention provide an understanding of the relationship between reliability of color measurement and ground-truth color. The experiment used three color charts of basic colors (red, green, and blue) composed of multiple patches that ranged over a wide-range of intensity (from 0.2 to 0.6) and saturation (from 0.05 to 0.5), and obtained their corresponding image views across three cameras. Next, the error between ground-truth hue values and their corresponding image measurements was determined.

It was noticed that hue error grew as both intensity and saturation became lower. The experiment provided strong empirical evidence of a correlation between the error in hue and the combination of saturation and intensity. It was empirically found that among the many potential combination possibilities for saturation and intensity, a product of the saturation and intensity appeared to serve as a color strength that provides good approximation power for the correlation.

FIG. 1 is a plot of hue error versus measured color strength from analysis of images obtained with an indoor camera, in accordance with embodiments of the present invention. The color strength used for generating FIG. 1 is proportional to the product of the saturation and intensity. In FIG. 1, the error in the hue measurement is shown with respect to color strength for images obtained with an indoor camera. Except for a few outliers, FIG. 1 shows that all large hue errors occur at low color strength. In addition, the error bars are much higher at lower color strength than at higher color strength, suggesting a reduction in hue error. For regions of homogeneous color, local hue variation provides a cue to determine whether hue will be accurately measured at the corresponding local color strength.

Additionally, testing performed on two different datasets by the inventors of the present invention demonstrated the predictive power of color strength for determination of hue error. These two datasets use very different approaches to perform color correction which shows that the result of the testing is not dependent on the type of ground truth methodology used for calculating the hue error.

The tested first dataset is a video sequence provided by Sunkavalli. See Sunkavalli, F. Romeiro, W. Matusik, T. Zickler and H. Pfister, "What do color changes reveal about an outdoor scene?" IEEE Conf. on Computer Vision and Pattern Recognition (CVPR) 2008).

The tested first dataset models time-varying changes in both direct sunlight and ambient skylight using static background pixels and performs color correction from frame to frame. Sunkavalli's color corrected sequence was used as ground truth in order to evaluate the hue error with respect to color strength.

Figure 2:
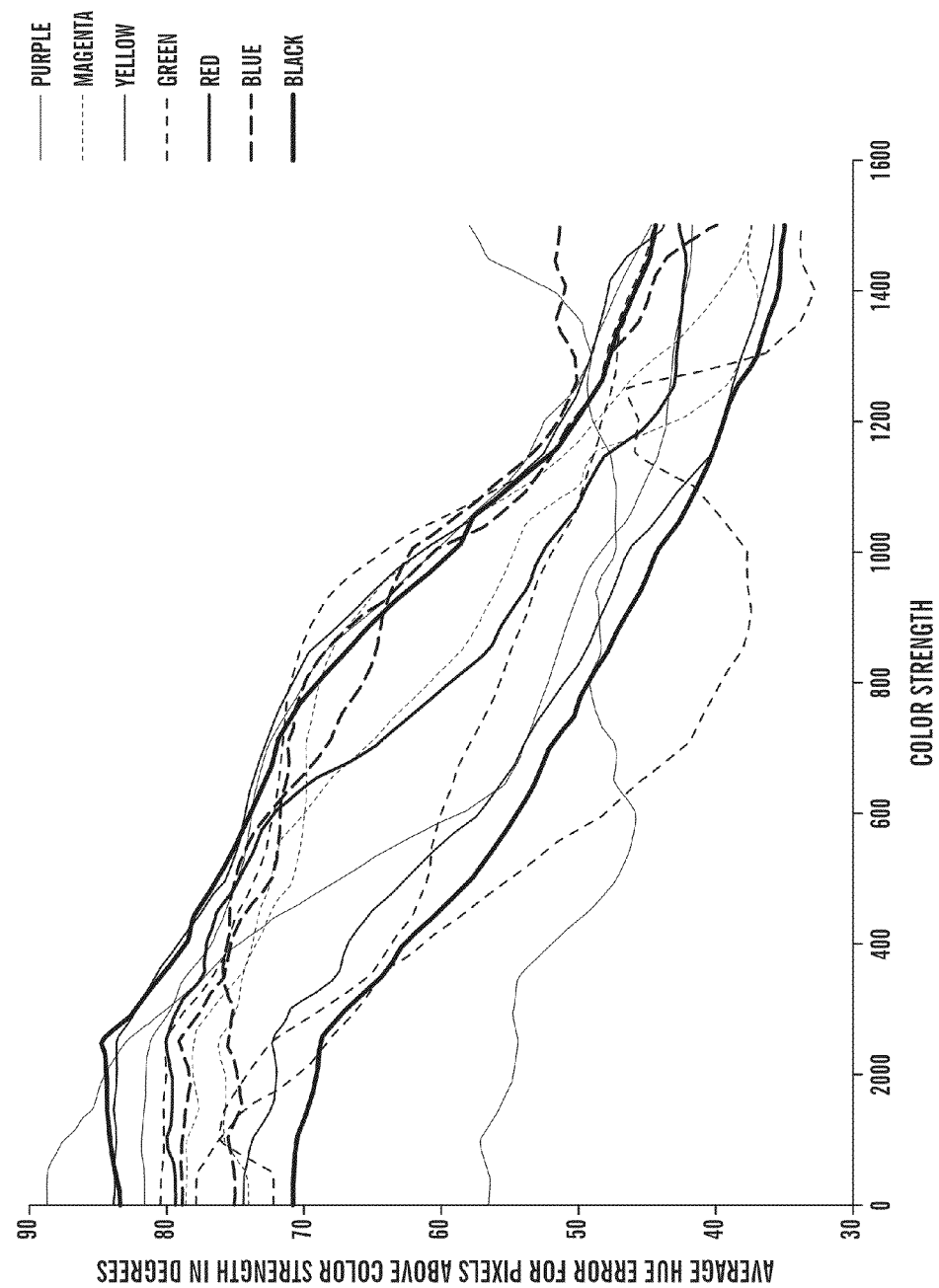
FIG. 2 is a plot of average hue error versus color strength for a first dataset, in accordance with embodiments of the present invention.

FIG. 2 is a plot of average hue error versus color strength for the first dataset of a video sequence, in accordance with embodiments of the present invention. The color strength used for generating FIG. 2 is proportional to a product of the saturation and intensity. In FIG. 2, the average hue error is significantly larger for pixels at low color strength for 16 different frames of varying lighting changes (approximately every 500$^{th}$ frame from the original sequence).

The tested second dataset is the very large (11K), real-world images taken by Ciurea. See F. Ciurea, and B. Funt, "A Large Image Database for Color Constancy Research," Proceedings of the Imaging Science and Technology Eleventh Color Imaging Conference, pp. 160-164, Scottsdale, November 2003.

Every image in this second dataset contains a small gray sphere which was physically connected to the camera. Ground truth color correction is computed based on the primary color mode of the brightest region on the gray sphere.

Figure 3:
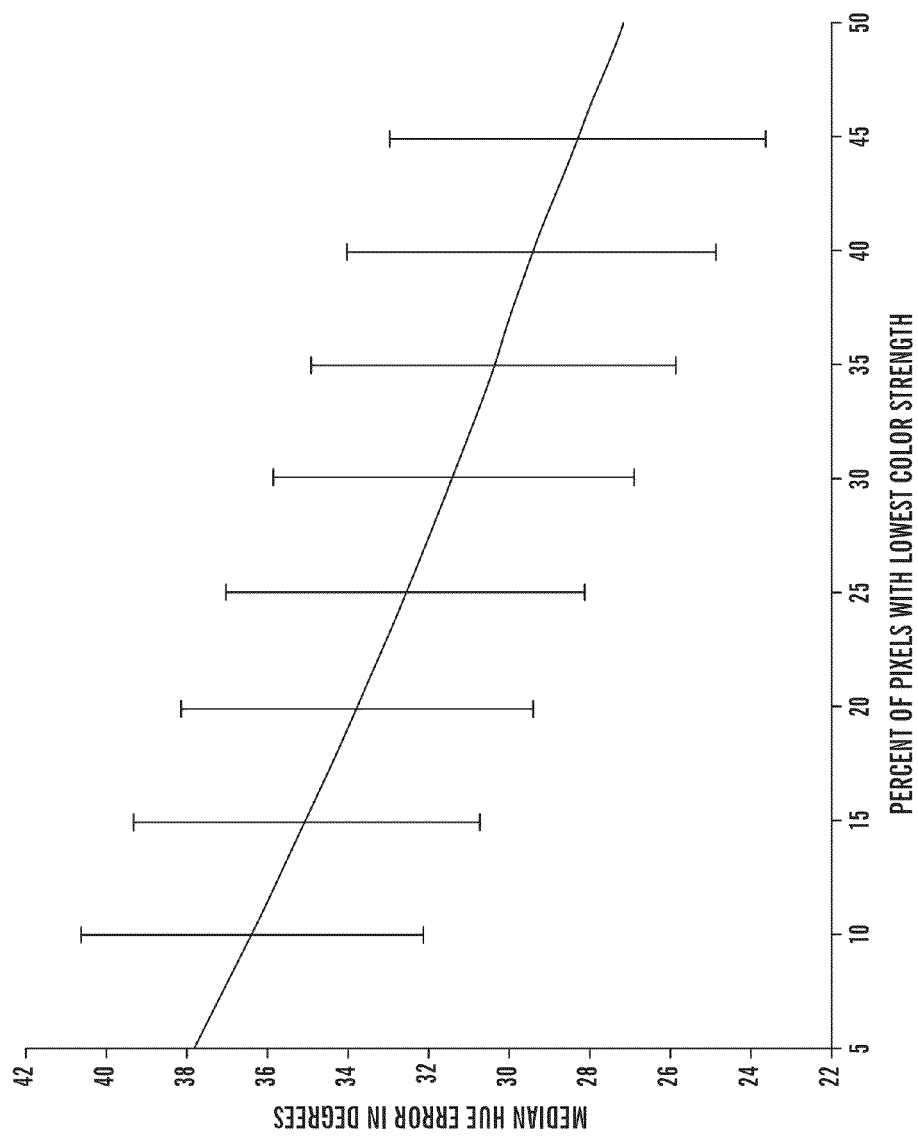
FIG. 3 is a plot of median hue error versus percent of pixels with lowest color strength for a second dataset, in accordance with embodiments of the present invention.

FIG. 3 is a plot of median hue error versus percent of pixels with lowest color strength for the second dataset of real world images, in accordance with embodiments of the present invention. The color strength used for generating FIG. 3 is proportional to a product of the saturation and intensity. The plot in FIG. 3 is for 11K images of a SFU gray ball dataset with 0.1 standard deviation error bar. In FIG. 3, the median hue error decreases significantly (from an average of 27° to an average greater than 37°) for smaller color strength. The median of the average hue error is over all images between the original image and its corresponding color corrected version. The hue error is computed using only the specified percent of pixels with the lowest color strength to guarantee that there is a known (and a reasonable) number of pixels for each measurement.

In both FIG. 2 and FIG. 3, there is significant reduction in hue error as color strength is increased.

Figure 4:
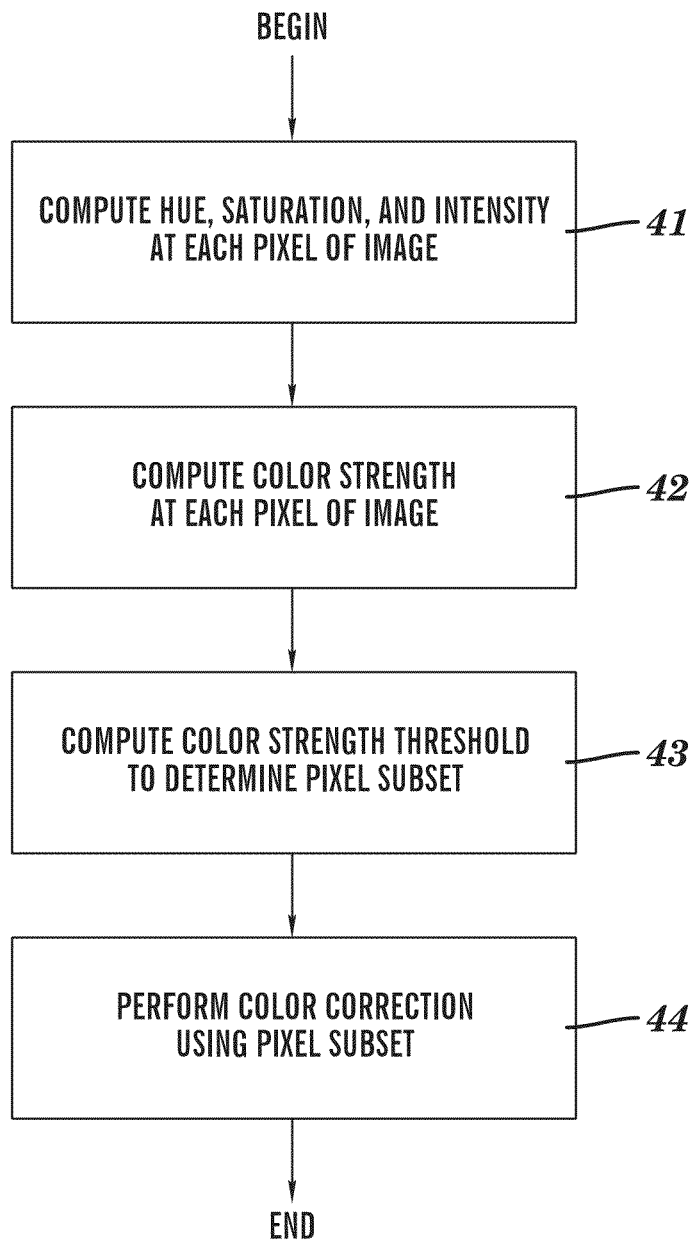
FIG. 4 is a flow chart describing color correction of a digital image, in accordance with embodiments of the present invention.

FIG. 4 is a flow chart describing color correction, in accordance with embodiments of the present invention. The flow chart of FIG. 4, which comprises steps 41-44, is applied as an experiment to the second dataset discussed supra in conjunction with FIG. 3. Steps 41-43 are performed via execution of color processing program code by one or more processors of the computer system of FIG. 9. Step 44 is performed via execution of color correction program code by the one or more processors.

In this experiment, four color correction methods were used: gray world (GW), general gray world (GGW), gray edge (GE) and second order gray edge (GE2) provided in Gijsenij to compare the performance of each method with and without color strength information. See E. A. Gijsenij, T. Gevers, and J. van de Wiejer, "Computational Color Constancy: Survey and Experiments," IEEE Trans. On Image Processing, Vol 20, No. 9, September 2011.

The preceding four color correction methods can all be derived as instantiations of the following framework of Equation (4):

$$\left( \int_{x \in A} \left| \frac{\partial^n f_{c,\rho}(x)}{\partial x^n} \right|^p dx \right)^{1/p} = k e_c^{n,p,o} \quad (4)$$

where $f_{c,o}(x)$ is the color of the pixel at location x, p is the Minkowski norm (p=1 is the average and p=∞ is the maximum.), σ is a Gaussian smoothing scale factor, n is the order of the derivative and A is the set of all pixels in the image. On the right hand side in Equation (4), $e_c$ represents the color vector of the light source normalized by a multiplicative constant k chosen so the vector has unit length.

For each method of the four color correction methods, the experiment used the optimal parameterization of the derivative order (n), Minkowski norm (p), and the smoothing scale (σ) as computed in Ciurea (F. Ciurea, and B. Funt, "A Large Image Database for Color Constancy Research," Proceedings of the Imaging Science and Technology Eleventh Color Imaging Conference, pp. 160-164, Scottsdale, November 2003) for the SFU dataset and shown in Table 1 depicted infra. Based on the model of the present invention, hue error is largest at low color strength. Therefore, the most valuable information for computing correction is found in pixels with low color strength. The experiment computes the result of color correction using all pixels (100%) of the entire image and using only 50% of the pixels with the lowest color strength.

In step 41 of FIG. 4, the color processing program code computes hue (H), saturation (S), and intensity (S) at each pixel of the image from the R, G, and B values according to Equations (1)-(3).

In step 42, the color processing program code computes color strength CS(x,y) at pixel location (x,y) as a function of saturation S(x,y) and intensity I(x,y), wherein x and y identify mutually orthogonal coordinates of the pixels of the image. For this experiment, CS(x,y)=S(x,y)×I(x,y) at pixel location (x,y).

In step 43, the color processing program code computes a color strength threshold (K) to determine a pixel subset that is a percent (or fraction) p of the pixels containing the digital image. The percent p (or fraction) is less than 100% (or less than 1) and is 50% for color correction applied to the second dataset.

Specifically, a function g(x,y) at pixel location (x,y) is defined via Equation (5).

$$g(x, y) = 1 \text{ if } CS(x, y) < K; \quad (5)$$
$$= 0 \text{ otherwise}$$

Step 43 determines K via Equation (6).

$$\sum_{x=1}^{M} \sum_{y=1}^{N} g(x, y) = \rho * M * N \quad (6)$$

The set of pixels A in equation (4) becomes the pixel subset A' determined in step 43:

$$A' = (x, y | S(x, y) * I(x, y) < K) \quad (7)$$

Thus, step 43 constrains the number of pixels in the pixel subset to be ρ percent (i.e., 50% in this example) of the total number of pixels in the image and determines K as being a value of color strength that exceeds the color strength of each pixel of the pixel subset A'. In one embodiment, K is the lowest color strength of any pixel of the image that is not in the pixel subset A'.

In step 44, the color correction program code performs color correction using the pixel subset A' determined in step 43 in each of the four color correction methods (gray world (GW), general gray world (GGW), gray edge (GE) second order gray edge (GE2)). Each of the preceding four color correction methods conventionally employs an algorithm that uses all pixels of the entire image. In contrast, the present invention uses only the pixel subset A' determined in step 43 as expressed in Equation (7).

For example, a gray world (GW) algorithm for color correction assumes that the average color in a scene is achromatic, as compared with the grey edge (GE) algorithm which assumes that the average edge difference in the scene is achromatic.

Thus for the gray world (GW) algorithm, if the image has sufficient amount of color variation, then the average value, taken over the image, of the red, green, and blue components in the image should be a common gray value. The gray world algorithm calculates the average values of the image's red, green, and blue color components and use these averages to determine a gray value for the image. With the gray world algorithm, each color component is scaled by a scale factor equal to a ratio of the gray value to the calculated average of each color component, which results in removal of undesired color tint or distortion. The scale parameters are examples of transformation parameters (alternatively called "color correction") used to perform color correction of an image using a color correction method.

To implement the gray world algorithm in accordance with the present invention, the average values of the red, green, and blue components of the image use the pixel subset A' determined from step 43 instead of using all pixels of the image to determine the average values of the red, green, and blue components of the image. Similarly, the present invention uses only the pixel subset determined by the present invention, such as the pixel subset determined in step 43, instead of all pixels of the image for performing any color correction method.

Table 1 shows the color correction error for the four color correction methods (GW, GCW, GE, GE2) using: (i) 50% of the pixels (i.e., the pixel subset) having the lowest color strength in the image for implementing the method of the present invention; and (ii) 100% of the pixels in the image as is typically used in conventional implementations.

TABLE 1

Color Correction Error For Color Correction Methods (GW, GCW, GE, GE2) Using Both 50% and 100% of the Pixels.

| | | Method Type (n, p, σ) | | | |
|---|---|---|---|---|---|
| Error Type | % Pixels | GW 0, 1, 0 | GGW 0, 13, 2 | GE 1, 1, 6 | GE2 2, 1, 5 |
| RMS | 50 | 6.81 | 4.32 | 4.53 | 4.60 |
| | 100 | 7.70 | 4.85 | 4.72 | 4.91 |
| Angular | 50 | 5.46 | 4.16 | 4.05 | 4.24 |
| | 100 | 6.24 | 4.47 | 4.37 | 4.60 |

The error in Table 1 is computed in two ways. RMS error is computed between the ground-truth corrected image and the corresponding color corrected image for each method. Angular error is computed between the ground truth illuminant and the estimated illuminant. Ground truth pertains to known images serving as a baseline against which the color corrected images are compared for computation of the RMS error and the angular error.

For all methods and for both error types (i.e., RMS error and angular error), it is inferred from Table 1 that incorporation of color strength information leads to significant improvement in the results. Table 1 shows that the method of the present invention using the pixel subset A' of 50% of the pixels having the lowest color strength in the image has significantly lower error for all color correction methods (GW, GCW, GE, GE2) than the conventional methods using 100% of the pixels in the image.

In one embodiment, the color strength CS is a polynomial $P_i(I, S)$ of two variables saturation (S) and intensity (I). The polynomial $P_i(I, S)$ may be found as the best fit such that the color strength monotonically correlates with hue error. This can be found by empirically determining (e.g., by measurement) the difference between measured image values of physical color charts displayed in an image and ground truth values (i.e., the known hue, saturation and intensity values). The difference between the measured and ground truth values indicates the hue error for each hue. The polynomial $P_i(I, S)$ may be different for each hue. Mathematically, the hue error $E_i$ for hue $h_i$ can be written as:

$$E_i \approx D[h_i^M(S, I), h_i^A(S, I)] \quad (8)$$

wherein $h_i^M(S, I)$ is the measured hue and $h_i^A(S, I)$ is the known actual hue for a color patch with given hue (h), saturation (S) and intensity (I). D is the magnitude of the difference between $h_i^M(S, I)$ and $h_i^A(S, I)$. The difference D may be computed via any distance metric such as the absolute difference (L1 norm) or the Euclidean distance. The color strength for hue $h_i$ is defined as $$\arg\min_{c_{00}, c_{01} \ldots c_{n \times m}} D[P_i(I, S)]$$

wherein the color strength $P_i(I, S)$ is a bi-variate polynomial of m x n dimensions that minimizes the hue error $E_i$. Specifically, $P_i(I, S)$ is of the form $$P_i(I, S) = \sum_{i=0}^{m} \sum_{j=0}^{n} c_{ij} I^i S^j, \quad (9)$$

Thus, the function $P_i(I, S)$ may be selected to minimize hue error with respect to a known actual hue (i.e., ground truth), which amount to determining the coefficients $c_{ij}$ that minimize hue error with respect to the known actual hue for the bi-variate polynomial form of $P_i(I, S)$.

In the case of m=1, n=1, $c_{00}$=0, $c_{10}$=0 and $c_{01}$=0, and for all hues being fit simultaneously, the color strength $P_i(I, S)$ is proportional to a product of saturation (S) and intensity (I).

In one embodiment, $P_i(I, S)$ in Equation (9) is non-linear in I if m≥2 and $c_{ij}$>0 for at least one value of i in the range of 2 to m.

In one embodiment, $P_i(I, S)$ in Equation (9) is non-linear in S if n≥2 and $c_{ij}$>0 for at least one value of j in the range of 2 to n.

In one embodiment, $P_i(I, S)$ in Equation (9) is non-linear in I, non-linear in S, or non-linear in both I and S.

More generally, the color strength $P_i(I, S)$ at each pixel of the pixel subset can be any function of the image channels (i.e., RGB colors) such as their hue (H), saturation (S), and intensity (I), or is a function of their red (R), green (G), and blue (B) values.

The preceding embodiment performs color correction using the pixel subset A' whose included pixels have a color strength below the color strength threshold K.

In another embodiment, the pixels of the pixel dataset have a color strength above a color strength threshold. For example, under some circumstances in which certain camera defects unusually bias the color information, the pixels of the pixel dataset used for color correction may be above a color strength threshold, depending on the nature of the camera defects.

In another embodiment, the pixels of the pixel dataset have a color strength within a specified range of color strength. For example, under some circumstances in which certain camera defects unusually bias the color information, the pixels of the pixel dataset used for color correction may be within a specified range of color strength, depending on the nature of the camera defects.

Thus, the color strength function can be applied to improve performance of color correction methods. This is accomplished by using only a pixel subset of the original pixels in the image depending on their color strength range. Similarly, other methods which use the hue of pixels in the image to compute image features such pixel or region color, edges or interest points or to compute other image properties such as color segmentation, pixels of a specified color, or to match colors across images can be improved by using only a subset of the original pixels in the image depending on their color strength range.

The preceding embodiments implement color correction by first specifying the percent (or fraction) p of the pixels containing the digital image and then computing the color strength threshold or threshold range that determines the pixel subset to be used for color correction.

Alternatively, color correction may be implemented by first specifying the color strength minimum threshold, maximum threshold, or threshold range and then determining the pixel subset to be used for color correction.

FIGS. 5-8 present a generalized formulation of the methodology of the present invention.

Figure 5:
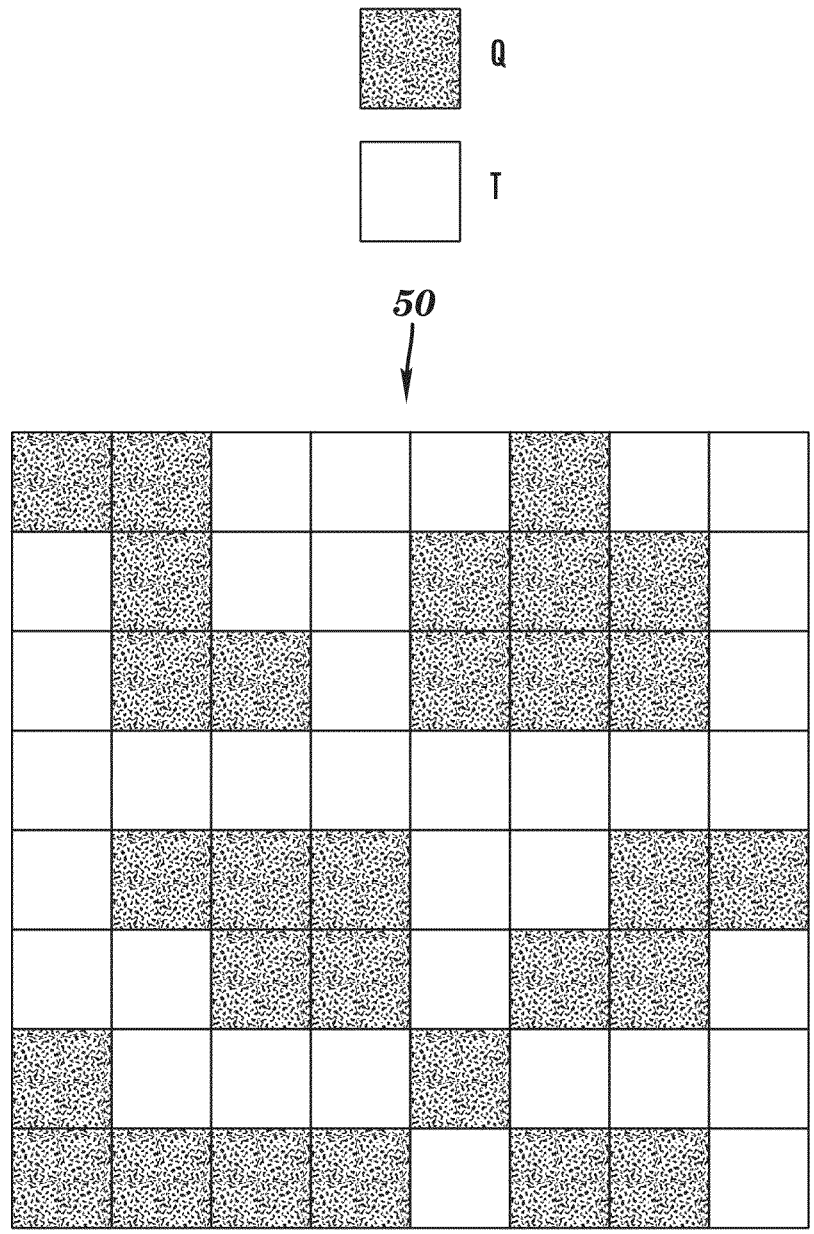
FIG. 5 depicts a digital image contained in a set of pixels, in accordance with embodiments of the present invention.

FIG. 5 depicts a digital image 50 contained in a set of pixels, in accordance with embodiments of the present invention. The set of pixels containing the image 50 consists of P pixels, wherein P=64 (i.e., 8×8) in the example of FIG. 5. The present invention identifies a pixel subset of Q pixels to be used for color correction, leaving T remaining pixels of the P pixels such that P=Q+T. In FIG. 5, the Q pixels and the T pixels are identified by included legends.

Figure 6:
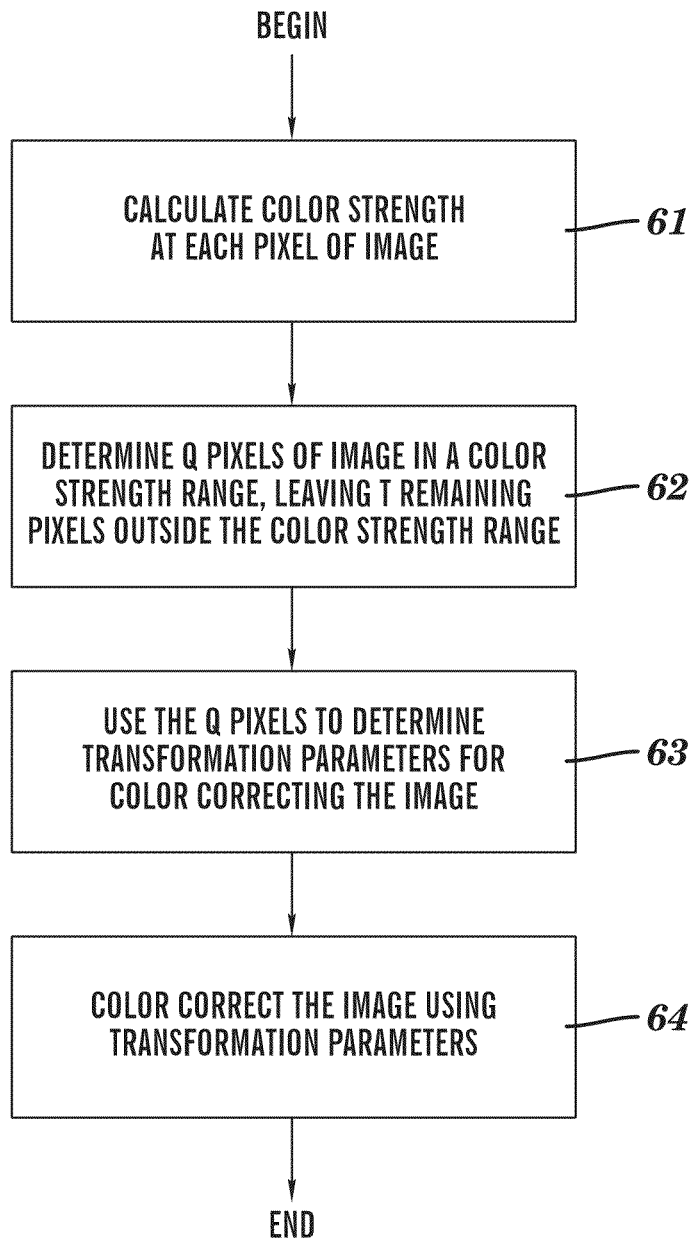
FIG. 6 is a flow chart for processing a digital image, in accordance with embodiments of the present invention.

FIG. 6 is a flow chart for processing a digital image, in accordance with embodiments of the present invention. The digital image 50 is contained in P pixels such that P is a positive integer of at least 4 as depicted in FIG. 5. Each pixel has a RGB color defined by a red (R) value, a green (G) value, and a blue (B) value. The flow chart of FIG. 6 comprises steps 61-64. Steps 61-63 are performed via execution of color processing program code by one or more processors of the computer system of FIG. 9. Step 64 is performed via execution of color correction program code by the one or more processors. Common and different portions of the color processing program code may be used to perform steps 61-63 of FIG. 6 than are used to perform steps 41-43 of FIG. 4. Common and different portions of the color correction program code may be used to perform step 64 of FIG. 6 than are used to perform step 44 of FIG. 4.

In step 61, the color processing program code determines a color strength at each pixel of the P pixels. The color strength may be calculated and expressed as a function of the R, G, and B values at each pixel of the P pixels. The color strength may more specifically based at least on respective intensities, respective saturations, or both the respective intensities and the respective saturations of the P pixels.

In one embodiment, the function of the R, G, and B values at each pixel of the P pixels (which represents the color strength) is a function of saturation (S) and intensity (I) at each pixel of the P pixels. The function of saturation (S) and intensity (I) at each pixel of the P pixels may be $\Sigma_{i=0}^{m} \Sigma_{j=0}^{n} c_{ij} I^i S^j$, wherein $c_{ij}$ are constants, and wherein m and n are each independently zero or a positive integer. An example is the case of m=1, n=1, $c_{00}$=0, $c_{10}$=0 and $c_{01}$=0 such that the function of the R, G, and B values at each pixel of the P pixels is proportional to a product of the saturation (S) and intensity (I) at each pixel of the P pixels. In another example, the function of the R, G, and B values at each pixel of the P pixels is non-linear in I, non-linear in S, or non-linear in both I and S. In another example, n=0 and m≥1. In another example, m=0 and n≥1.

In one embodiment, the function of the R, G, and B values at each pixel of the P pixels is a function of saturation (S), intensity (I), and hue (H) at each pixel of the P pixels.

Figure 7:
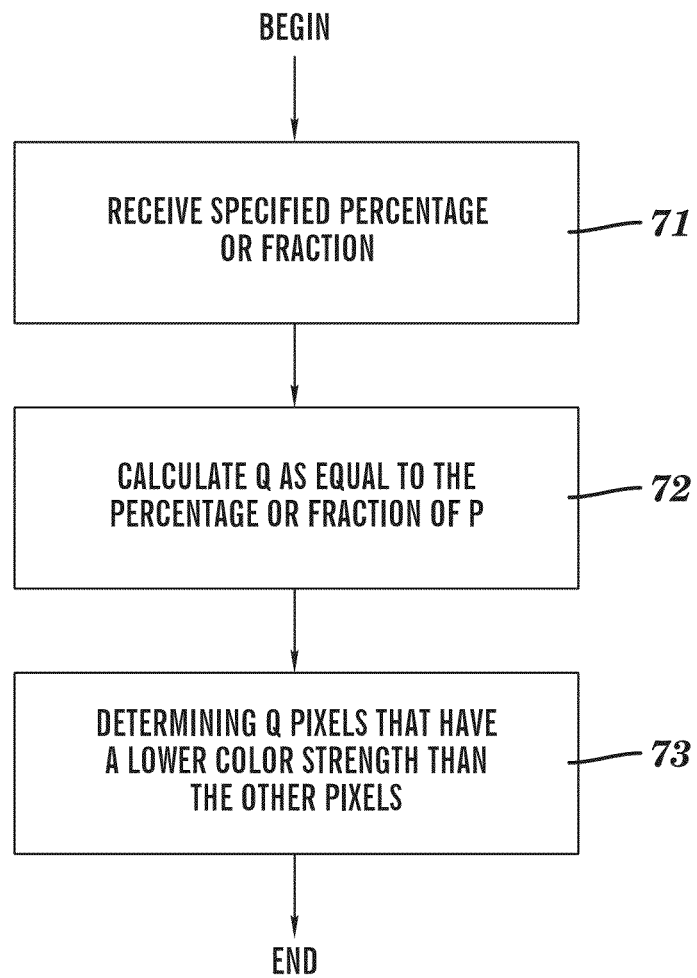
FIG. 7 is a flow chart for determining a pixel subset of an image by specification of a percentage or fraction of the pixels of the image to be used for color correction, in accordance with embodiments of the present invention.
Figure 8:
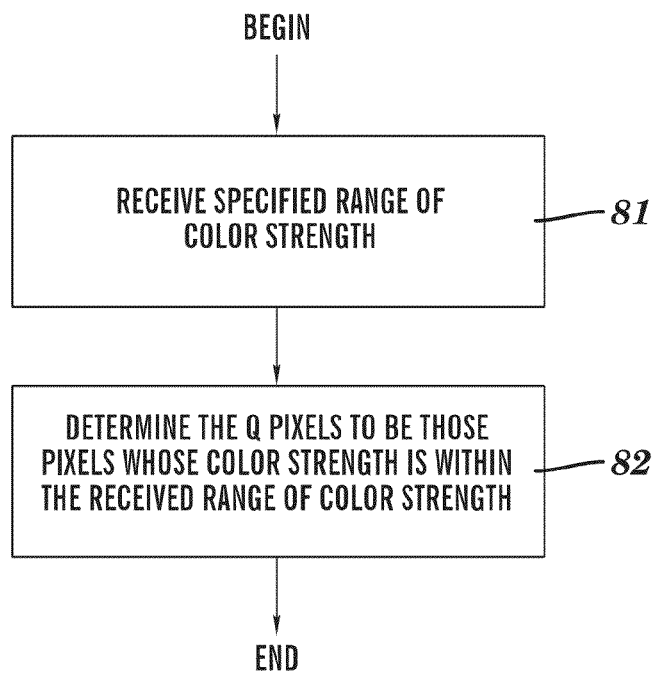
FIG. 8 is a flow chart for determining a pixel subset of an image by specification of a range of color strength that determines the pixels of the image to be used for color correction, in accordance with embodiments of the present invention.

In step 62, the color processing program code determines Q pixels of the P pixels which is a subset of the P pixels, leaving T remaining pixels of the P pixels (i.e. all other pixels of the P pixels) such that P=Q+T, wherein Q and T are each positive integers less than P, as illustrated in the example of FIG. 5. The computed color strength at each pixel of the Q pixels is within a range of color strength and the computed color strength at each pixel of the T pixels is outside the range of color strength. FIGS. 7 and 8 depict different embodiments for implementing step 62.

In step 63, the color processing program code uses the Q pixels to determine color correction (e.g., transformation parameters) for color correcting of the digital image. The color correction (e.g., transformation parameters) for the P pixels may be based in part on the colors of the respective pixels in the pixel subset Q. The Q pixels are the only pixels of the P pixels used to determine the color correction (e.g., transformation parameters).

In step 64, the color correction program code color corrects the digital image by applying the color correction (e.g., transformation parameters) to the P pixels to correct the colors of the P pixels such as by modifying the RGB colors of the P pixels.

FIG. 7 is a flow chart for determining a pixel subset of Q pixels in step 62 of FIG. 6 by specification of a percentage or fraction of the pixels of the image to be used for color correction, in accordance with embodiments of the present invention. The flow chart of FIG. 7 comprises steps 71-73.

In step 71, the color processing program code receives a specified a percentage or fraction.

In step 72, the color processing program code calculates Q (i.e., a total number of pixels in the pixel subset Q) as equal to the percentage or fraction of P rounded to the nearest positive integer less than P.

In step 73, the color processing program code determines Q pixels that have a lower color strength than each pixel of the T pixels (i.e., of any other pixel of the P pixels).

FIG. 8 is a flow chart for determining a subset (called "pixel subset") of Q pixels in step 62 of FIG. 6 by specification of a range of color strength that determines the pixels of the image to be used for color correction, in accordance with embodiments of the present invention. The flow chart of FIG. 8 comprises steps 81-82.

In step 81, the color processing program code receives the specified range of color strength.

In one embodiment, the received range of color strength encompasses color strength below a specified color strength threshold. The specified color strength threshold may exceed zero.

In one embodiment, the received range of color strength encompasses color strength above a specified color strength threshold. The specified color strength threshold may exceed zero.

In one embodiment, the received range of color strength encompasses color strength above a specified first color strength threshold and below a specified second color strength threshold, and wherein the second color strength threshold exceeds the first color strength threshold. The first specified color strength threshold and/or the second color strength threshold may exceed zero.

In step 82, the color processing program code determines the Q pixels (i.e., the a total number of pixels in the pixel subset Q) to be those pixels of the P pixels whose color strength is within the received range of color strength.

Figure 9:
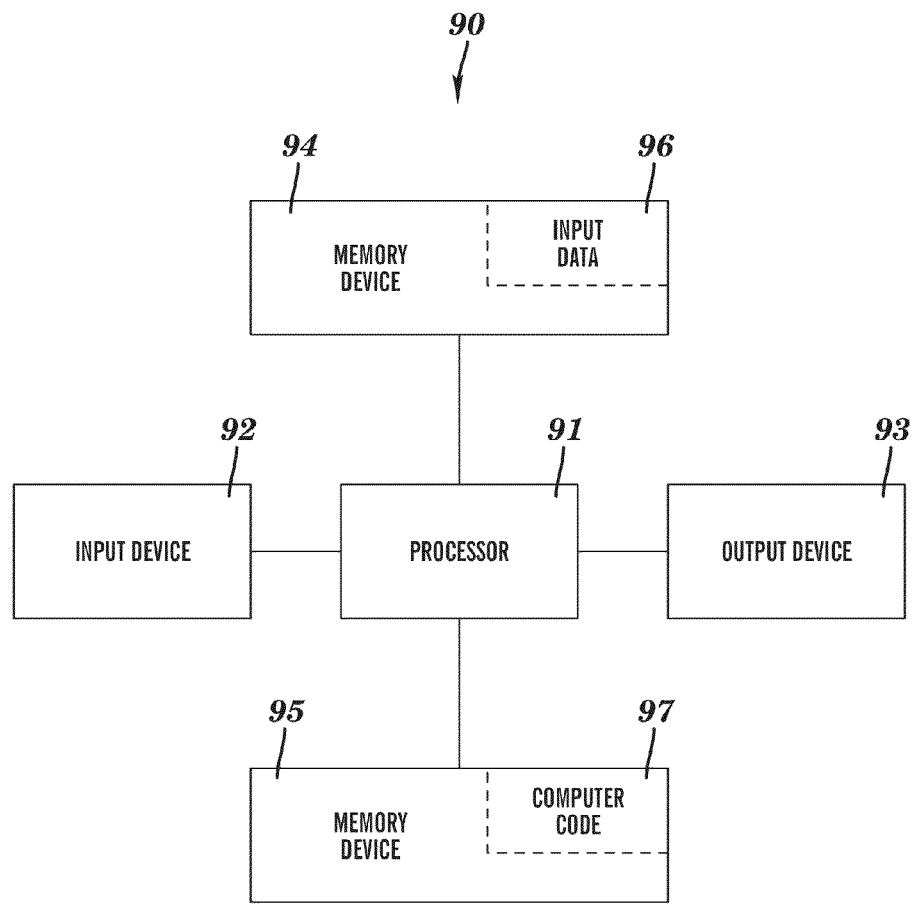
FIG. 9 illustrates a computer system used for processing a digital image, in accordance with embodiments of the present invention.

FIG. 9 illustrates a computer system 90 used for processing a digital image, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97 which is a computer program that comprises computer-executable instructions. The computer code 97 includes software or program instructions that may implement an algorithm for processing a digital image. The computer code 97 includes the color processing program code and color correction program code discussed supra in conjunction with FIGS. 4, 6, 7, and 8. In general, the color processing program code and color correction program code may be within separate and distinct computer programs or may be within a same computer program. The processor 91 executes the computer code 97. In general, one or more processors (similar to the processor 91) may be used to execute the program code 97 which includes the color processing program code and the color correction program code. The memory device 94 includes input data 96. The input data 96 includes input required by the computer code 97. The output device 93 displays output from the computer code 97. Either or both memory devices 94 and 95 (or one or more additional memory devices not shown in FIG. 9) may be used as a computer readable storage device (or program storage device) having a computer readable program embodied therein and/or having other data stored therein, wherein the computer readable program comprises the computer code 97. Generally, a computer program product (or, alternatively, an article of manufacture) of the computer system 90 may comprise the computer readable storage device (or the program storage device). The term "computer readable storage device" does not include a propagation media.

Thus the present invention discloses a process for supporting computer infrastructure, integrating, hosting, maintaining, and deploying computer-readable code into the computer system 90, wherein the code in combination with the computer system 90 is capable of performing a method for processing a digital image.

While FIG. 9 shows the computer system 90 as a particular configuration of hardware and software, any configuration of hardware and software, as would be known to a person of ordinary skill in the art, may be utilized for the purposes stated supra in conjunction with the particular computer system 90 of FIG. 9. For example, the memory devices 94 and 95 may be portions of a single memory device rather than separate memory devices. In another example, the processor 91 may be replaced by one or more processors.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for color-correcting a digital image comprising P pixels, P being a positive integer of at least 4, each of the P pixels having a respective color, the method comprising;
    determining, by one or more processors, color strengths of the P pixels, respectively, based at least on respective intensities, respective saturations, or both the respective intensities and the respective saturations of the P pixels;
    determining, by the one or more processors, a subset in the P pixels less than all of the P pixels, the pixels in the subset having respective color strengths in a range of respective color strength, all other pixels of the P pixels having respective color strengths outside of the range of respective color strengths;
    determining, by the one or more processors, color correction for the P pixels based in part on the colors of the respective pixels in the subset which are the only pixels of the P pixels used for determining the color correction parameters; and
    correcting the colors of the P pixels based on the color correction.

2. The method of claim 1, wherein the color strengths of the P pixels are based on both the respective saturations and the respective intensities of the P pixels.

3. The method of claim 2, wherein the color strength of each of the P pixels is based on $\Sigma_{i=0}^{m}\Sigma_{j=0}^{n} c_{ij} I^i S^j$, wherein coefficients $c_{ij}$ are constants, I is the intensity of the respective pixel, S is the saturation of the respective pixel, m is a positive integer, and n is zero or a positive integer.

4. The method of claim 3, wherein m=1, n=1, $c_{00}$=0, $c_{10}$=0 and $c_{01}$=0 such that the color strength of each of the P pixels is proportional to a product of the saturation (S) and the intensity (I) at each of the P pixels.

5. The method of claim 3, wherein the color strength at each of the P pixels is non-linear in I, non-linear in S, or non-linear in both I and S.

6. The method of claim 3, the method further comprising:
    determining, by the one or more processors, the coefficients $c_{ij}$ that minimize hue error with respect to a known actual hue.

7. The method of claim 1, wherein the color strength of each of the P pixels is a function of saturation (S), intensity (I), and hue (H) at the respective P pixel.

8. The method of claim 1, wherein the determining the subset comprises:
    receiving a specified a percentage or fraction;
    calculating a total number of pixels in the subset as equal to the percentage or fraction of P rounded to the nearest positive integer less than P; and
    determining the pixels in the subset as being the total number of pixels having a lower color strength than any other pixel of the P pixels.

9. The method of claim 1, wherein the determining the subset comprises:
    receiving the range of respective color strengths; and
    determining the pixels in the subset as being those pixels of the P pixels whose color strength is within the received range of respective color strengths.

10. The method of claim 9, wherein the received range of respective color strengths encompass color strength below a specified color strength threshold.

11. The method of claim 9, wherein the received range of respective color strengths encompass color strength above a specified color strength threshold.

12. The method of claim 9, wherein the received range of respective color strength encompass color strength above a specified first color strength threshold and below a specified second color strength threshold, and wherein the second color strength threshold exceeds the first color strength threshold.

13. A computer program product for color-correcting a digital image comprising P pixels, P being a positive integer of at least 4, each of the P pixels having a respective color, the computer program product comprising:
    a computer readable storage device;
    first program instructions to determine color strengths of the P pixels, respectively, based at least on respective intensities of the P pixels;
    second program instructions to determine a subset of the P pixels less than all of the P pixels, the pixels in the subset having respective color strengths in a range of respective color strength, all other pixels of the P pixels having respective color strengths outside of the range of respective color strengths;
    third program instructions to determine color correction parameters for the P pixels based in part on the colors of the respective pixels in the subset which are the only pixels of the P pixels used for determining the color correction; and
    fourth program instructions to correct the colors of the P pixels based on the color correction
    wherein the first program instructions, the second program instructions, the third program instructions, and the fourth program instructions are stored on the computer readable storage device for execution by one or more processors.

14. The computer program product of claim 13, wherein the color strengths of the P pixels are based on both the respective intensities and respective saturations of the P pixels.

15. The computer program product of claim 14, wherein the color strength of each of the P pixels is based on $\Sigma_{i=0}^{m}\Sigma_{j=0}^{n} c_{ij} I^{i}S^{j}$, wherein coefficients $c_{ij}$ are constants, I is the intensity of the respective pixel, S is the saturation of the respective pixel, m is a positive integer, and n is zero or a positive integer.

16. The computer program product of claim 15, wherein $m=1$, $n=1$, $c_{00}=0$, $c_{10}=0$ and $c_{01}=0$ such that the color strength of each of the P pixels is proportional to a product of the saturation (S) and the intensity (I) at each of the P pixels.

17. A computer program product for color-correcting a digital image comprising P pixels, P being a positive integer of at least 4, each of the P pixels having a respective color, the computer program product comprising:
   a computer readable storage device;
   first program instructions to determine color strengths of the P pixels, respectively, based at least on respective saturations of the P pixels;
   second program instructions to determine a subset of the P pixels less than all of the P pixels, the pixels in the subset having respective color strengths in a range of respective color strength, all other pixels of the P pixels having respective color strengths outside of the range of respective color strengths;
   third program instructions to determine color correction parameters for the P pixels based in part on the colors of the respective pixels in the subset which are the only pixels of the P pixels used for determining the color correction; and
   fourth program instructions to correct the colors of the P pixels based on the color correction
   wherein the first program instructions, the second program instructions, the third program instructions, and the fourth program instructions are stored on the computer readable storage device for execution by one or more processors.

18. A method for color-correcting a digital image comprising P pixels, P being a positive integer of at least 4, each of the P pixels having a respective color, the method comprising;
   determining, by one or more processors, color strengths of the P pixels, respectively, based at least on respective intensities and respective saturations of the P pixels;
   determining, by the one or more processors, a subset of the P pixels less than all of the P pixels, the pixels in the subset having respective color strengths less than respective color strengths of other pixels of the P pixels;
   determining, by the one or more processors, color correction parameters for the P pixels based in part on the colors of the respective pixels in the subset which are the only pixels of the P pixels used for determining the color correction; and
   correcting the colors of the P pixels based on the color correction.

19. The method of claim 18, wherein the color strength of each of the P pixels is based on $\Sigma_{i=0}^{m}\Sigma_{j=0}^{n} c_{ij} I^{i}S^{j}$, wherein coefficients $c_{ij}$ are constants, I is the intensity of the respective pixel, S is the saturation of the respective pixel, m is a positive integer, and n is zero or a positive integer.

20. The method of claim 19, wherein $m=1$, $n=1$, $c_{00}=0$, $c_{10}=0$ and $c_{01}=0$ such that the color strength of each of the P pixels is proportional to a product of the saturation (S) and the intensity (I) at each of the P pixels.

\* \* \* \* \*